Apparatus for Ventilating Hay mows, &c.
George Race.
72081
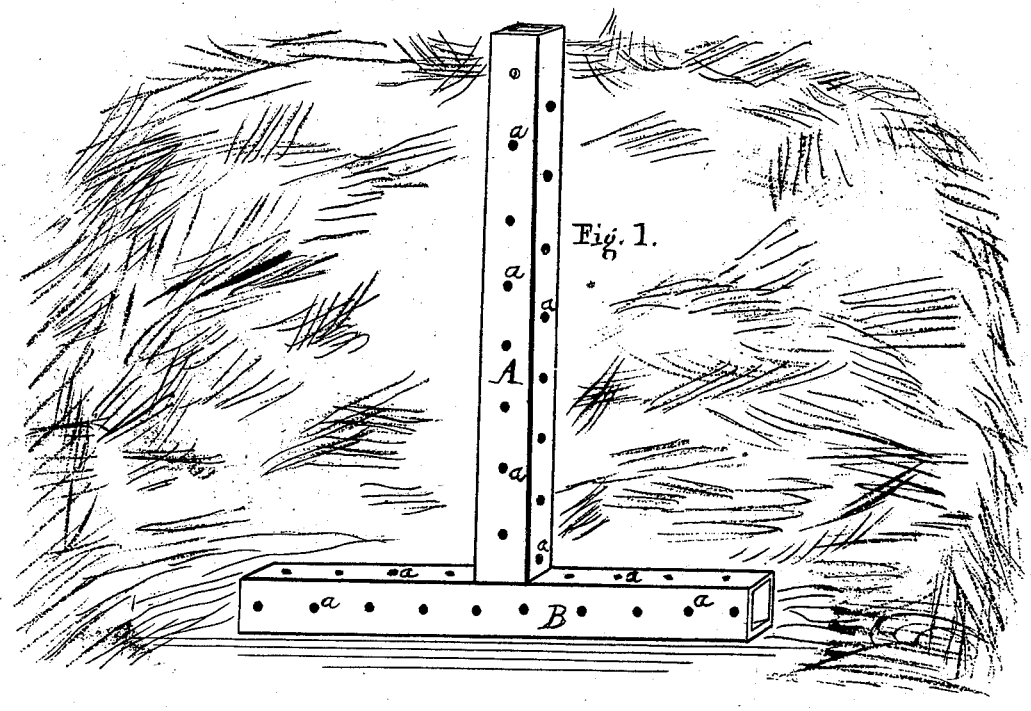
PATENTED
DEC 10 1867
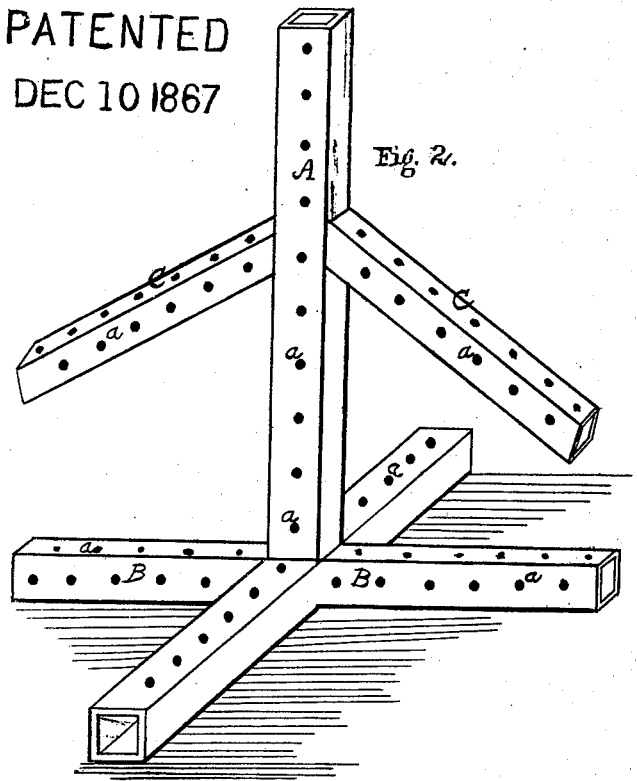

United States Patent Office.

GEORGE RACE, OF NORWICH, NEW YORK.

Letters Patent No. 72,081, dated December 10, 1867.

IMPROVEMENT IN VENTILATING HAY-MOWS.

The Schedule referred to in these Letters Patent and making part of the same.

TO ALL WHOM IT MAY CONCERN:

Be it known that I, GEORGE RACE, of Norwich, in the county of Chenango, in the State of New York, have invented a certain new and useful Device, Apparatus, and Method of Ventilating Hay, Grain, or other Vegetable Substances in the Mow or in the Stack; and the following is a full, clear, and exact description of the same, reference being had to the accompanying drawings, making a part of this specification, in which—

Figure 1 represents a section cut through a hay-mow, up to the place where the perforated box or pipe is mowed in.

Figure 2 shows the device, in one form, which may be used to prevent mows of hay or of grain, or stacks, from heating, and being damaged by being put up before the hay or grain is sufficiently dry or cured.

The object of my invention is to prevent loss and damage to hay or grain in the straw, by being put up in mows or stacks before it is dry, or sufficiently cured to prevent it from heating, moulding, blacking, and rotting; and also to save farmers time in making hay and securing it in bad weather; as also the risk of putting wheat, rye, barley, oats, or other vegetables in mows or stacks before it is sufficiently cured.

My invention consists in making pipes of boards or strips, of any desired dimensions, and perforating them with holes on all of their sides, and placing one or more of them in such a position that the hay or grain can be mowed or stacked up around them, leaving a passage for any heat that may be generated in the mow or stack to escape at the top, as smoke does from a chimney.

To enable others to make and use my invention, I will describe it more fully, referring to the drawings and to the letters marked thereon.

To make my hay-mow ventilator, I take rough boards, of any desired length and width, and nail them together, so as to make a pipe, A. I then bore the sides full of holes, *a a a a*, so as to give vent on all sides. If desirable, a similarly made pipe, B, may be placed at right angles, as a base for the vertical pipe A to rest on, or sections of other pipes, C C, may be placed at different angles in the mow of hay or grain, so as to have an opening into the vertical pipe A, which forms the chimney or conductor for the outlet of the other pipes, B and C C, which form flues, through which a current of air passes in from the outside, and most effectually carries off any dampness or vapor which may be generated in the mow by fermentation or heat, thereby preventing the moulding, blackening, or mow-burning of hay or grain.

The advantages of the device above described are obvious to all farmers, and need no comment.

What I claim as new, and desire to secure by Letters Patent, is—

Making vertical perforated pipes, having lateral branches extending out from the main pipe, for the purpose of ventilating hay-mows, and stacks of hay or grain, substantially as herein set forth.

GEORGE RACE.

Witnesses:
ROBERT A. STANTON,
CHAS. S. CARPENTER.